(12) United States Patent
Corvasce et al.

(10) Patent No.: US 7,581,575 B2
(45) Date of Patent: *Sep. 1, 2009

(54) PNEUMATIC TIRE WITH TREAD HAVING DEGRADABLE TREAD FILLER

(75) Inventors: Filomeno Gennaro Corvasce, Mertzig (LU); Laurent Luigi Domenico Colantonio, Bastogne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 407 days.

This patent is subject to a terminal disclaimer.

(21) Appl. No.: 11/524,589

(22) Filed: Sep. 21, 2006

(65) Prior Publication Data

US 2007/0074797 A1    Apr. 5, 2007

Related U.S. Application Data

(60) Provisional application No. 60/723,756, filed on Oct. 5, 2005.

(51) Int. Cl.
*B60C 1/00* (2006.01)
*B60C 11/00* (2006.01)
*B60C 11/03* (2006.01)

(52) U.S. Cl. .................. 152/209.5; 152/209.17
(58) Field of Classification Search .............. 152/209.5, 152/209.17
See application file for complete search history.

(56) References Cited

U.S. PATENT DOCUMENTS

| | | | | |
|---|---|---|---|---|
| 1,714,999 | A * | 5/1929 | Burdette | 264/317 |
| 1,762,723 | A * | 6/1930 | Manly et al. | 264/317 |
| 1,876,016 | A * | 9/1932 | Pederson | 152/209.5 |
| 2,148,343 | A | 2/1939 | Flautt | 152/210 |
| 2,960,138 | A | 11/1960 | Chiodo | 152/209 |
| 6,045,745 | A * | 4/2000 | Reno | 264/317 |
| 6,408,910 | B1 | 6/2002 | Lagnier et al. | 152/209.17 |
| 6,591,881 | B2 | 7/2003 | Artrip | 152/209.5 |
| 7,249,620 | B2 * | 7/2007 | Croissant et al. | 152/209.17 |
| 7,252,728 | B2 * | 8/2007 | Weydert et al. | 152/209.17 |
| 2004/0089384 | A1 * | 5/2004 | Lopez et al. | 152/154.2 |
| 2006/0005905 | A1 * | 1/2006 | Croissant et al. | 152/154.2 |
| 2006/0005912 | A1 * | 1/2006 | Weydert et al. | 152/154.2 |
| 2006/0151079 | A1 * | 7/2006 | Weydert et al. | 152/DIG. 3 |

FOREIGN PATENT DOCUMENTS

BE    399026    * 11/1933
JP    2002-240509    * 8/2002

OTHER PUBLICATIONS

European Search Report, Jan. 12, 2007.

* cited by examiner

*Primary Examiner*—Steven D Maki
(74) *Attorney, Agent, or Firm*—John D. DeLong

(57) ABSTRACT

A tire having a tire tread, the tread having a groove void radially inward of a wearable tread portion; and a degradable tread filler disposed in and substantially filling the groove void, the void being exposed upon wear of the wearable tread portion and dislocation of the degradable tread filler.

5 Claims, 1 Drawing Sheet

PNEUMATIC TIRE WITH TREAD HAVING DEGRADABLE TREAD FILLER

CROSS REFERENCE TO OTHER APPLICATIONS

This application claims the benefit of Ser. No. 60/723,756 filed Oct. 5, 2005.

FIELD OF THE INVENTION

The present invention relates to a pneumatic tire, and more particularly to a tread of a pneumatic tire wherein the tread is configured to provide a different tread pattern as the tire is worn.

BACKGROUND OF THE INVENTION

Tire tread patterns are provided with numerous elements such as ribs and blocks, the elements being separated by circumferential and/or transverse grooves. The grooves provide means for water evacuation and form the biting edges of the tread elements.

When a tire is new, the tread has a maximum tread height. This initial height may vary depending upon the intended use of the tire; a winter tire has an increased tread depth in comparison to an all season tire. Regardless of the initial tread depth, when the tire is new, the tread elements have an initial stiffness. The actual stiffness of the tread elements is dictated by the block size, shape, and the presence of any siping. As the tread is worn, the block height decreases while the tread element stiffness increases. As the tread stiffness increases, some desired tire characteristics, such as wet skid and wet handling, decrease. Hydroplaning characteristics also decrease with increased tread wear due to the reduced groove volume.

It would be desirable, then, to better maintain a tire's performance characteristics as the tire wears.

SUMMARY OF THE INVENTION

A pneumatic tire comprising a tire tread, the tread comprising a non-skid depth d, the tread comprising tread elements separated by a tread groove and a circumferential or lateral groove in at least one of the tread elements, wherein a separately cured, wearable tread portion is located in the radially outermost portion of the circumferential or lateral groove or a portion of the circumferential or lateral groove, the wearable tread portion being chemically bonded or mechanically secured in the groove or groove portion to the interior surface of the groove or groove portion such that the radially outer surface of the wearable tread portion is substantially flush and continuous with the ground contacting surface of the at least one tread element, the wearable tread portion covering the groove or groove portion with a groove void being created radially inward of the wearable tread portion, the groove void being exposed upon wear of the tread, each of the tread groove and circumferential or lateral groove having the non-skid depth d; and a degradable tread filler disposed in and substantially filling the groove void, the void being exposed upon wear of the wearable tread portion and dislocation of the degradable tread filler.

DEFINITIONS

The following definitions are controlling for the disclosed invention.

"Annular" means formed like a ring.

"Axial" and "axially" are used herein to refer to lines or directions that are parallel to the axis of rotation of the tire.

"Circumferential" means lines or directions extending along the perimeter of the surface of the annular tire parallel to the Center Line (CL) and perpendicular to the axial direction.

"Groove" means an elongated void area in a tread that may extend circumferentially or laterally about the tread in a straight curved, or zigzag manner. Circumferentially and laterally extending grooves sometimes have common portions and may be sub classified as "wide", "narrow", or "sipe". A sipe typically is formed by steel blades inserted into a cast or machined mold or tread ring therefor. In the appended drawings, excluding close up drawings, sipes are illustrated by single lines because they are so narrow. A "sipe" is a groove having a width in the range from about 0.2 percent to 0.8 percent of the compensated tread width, whereas a "narrow groove" has a width in the range from about 0.8 percent to 3 percent of the compensated tread width and a "wide groove" has a width greater than 3 percent thereof. The "groove width" is equal to tread surface area occupied by a groove or groove portion, the width of which is in question, divided by the length of such groove or groove portion; thus, the groove width is its average width over its length. Grooves, as well as other voids, reduce the stiffness of tread regions in which they are located. Sipes often are used for this purpose, as are laterally extending narrow or wide grooves. Grooves may be of varying depths in a tire. The depth of a groove may vary around the circumference of the tread, or the depth of one groove may be constant but vary from the depth of another groove in the tire.

"Inner" means toward the inside of the tire and "outer" means toward its exterior.

"Lateral" means an axial direction.

"Nonskid" means the depth of grooves in a tire tread.

"Radial" and "radially" are used to mean directions radially toward or away from the axis of rotation of the tire.

BRIEF DESCRIPTION OF THE DRAWINGS

The invention will be described by way of example and with reference to the accompanying drawings in which.

DETAILED DESCRIPTION OF THE INVENTION

Figure 1:
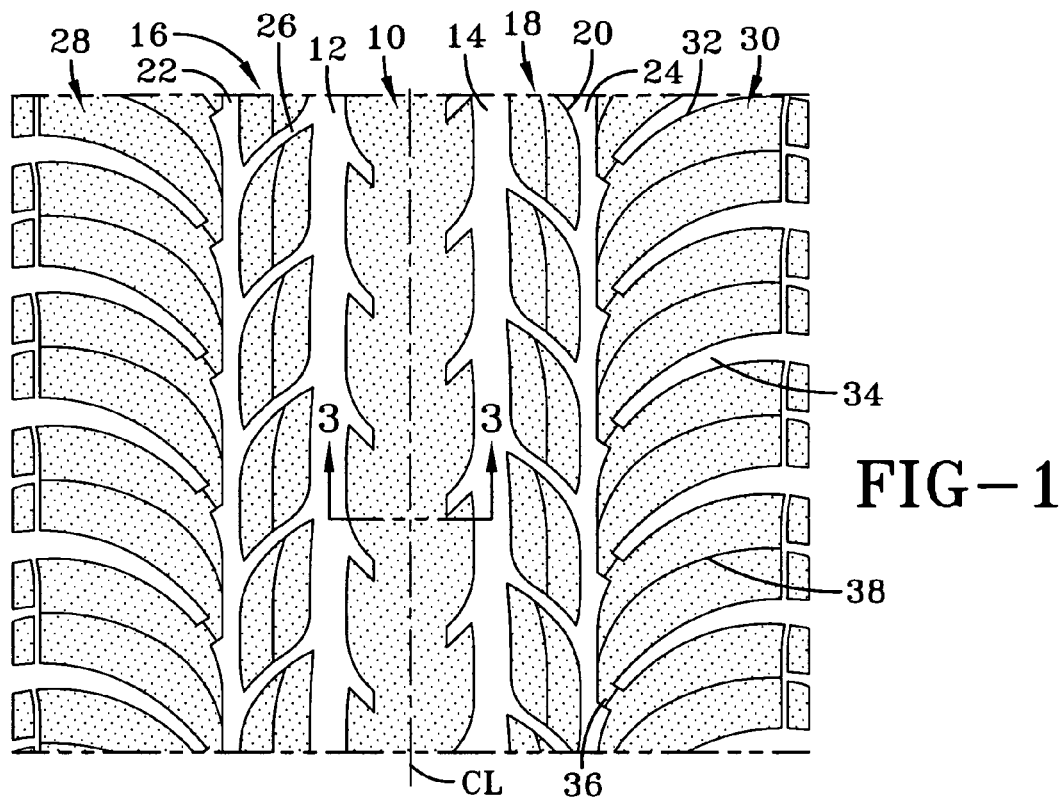
FIG. 1 is a tread in accordance with the invention.

The following language is of the best presently contemplated mode or modes of carrying out the invention. This description is made for the purpose of illustrating the general principles of the invention and should not be taken in a limiting sense. The scope of the invention is best determined by reference to the appended claims.

The present invention is directed to a tire having a tire tread, the tread having a groove void radially inward of a wearable tread portion; and a degradable tread filler disposed in and substantially filling the groove void, the void being exposed upon wear of the wearable tread portion and dislocation of the degradable tread filler.

A tire tread, located on the radially outer surface of a tire, is characteristically defined by a plurality of extending tread elements in the form of blocks and/or ribs. Such tread elements are formed by circumferentially extending and/or laterally extending grooves. In the exemplary tread of FIG. 1, at the unworn stage, the tread is defined by four circumferentially extending grooves, dividing the tread into five rows of tread elements. The tread element row 10 located on the tread centerline CL is a rib defined by circumferential grooves 12, 14. The tread element rows 16, 18 bordering the center tread element row 10 are a plurality of blocks 20 formed by the circumferential rows 12, 14, 22, 24 and lateral grooves 26.

Axially outward of the outer circumferential rows 22, 24 are the axially outermost tread element rows 28, 30. These rows 28, 30 have a plurality of quasi blocks 32. The blocks 32 are formed by the circumferential grooves 22, 24 and inclined lateral grooves 34; however, the blocks 32 are connected at the axially inner edges by a connecting element 36. The blocks 20, 32 and the connecting element 36 are also provided with sipes 38 to increase the number of biting edges in the tread.

Figure 2:
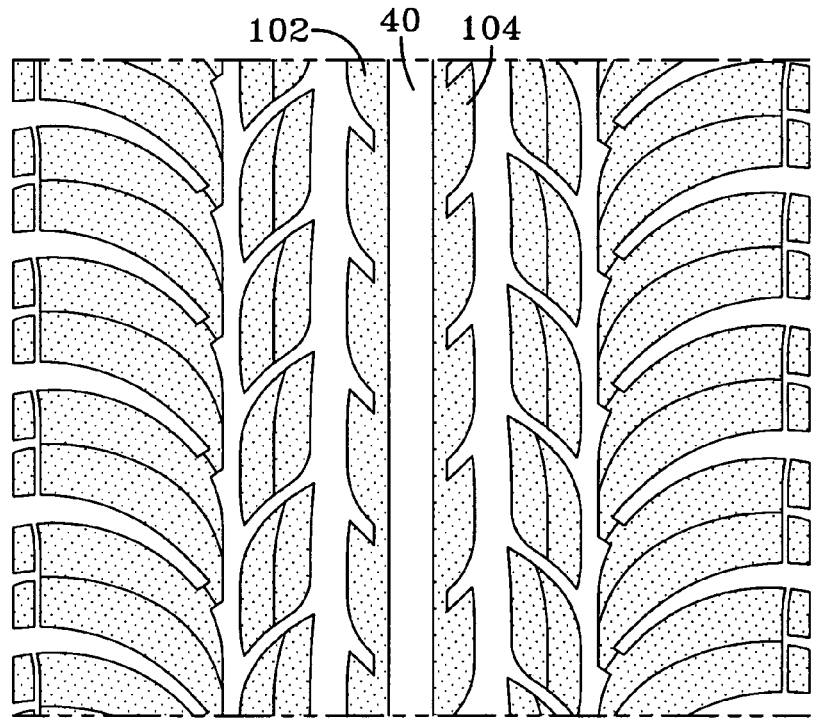
FIG. 2 is the tread of FIG. 1, following a defined amount of wear.

The tread of FIG. 2 is the tread of FIG. 1 after approximately 30 percent wear. The worn/molded tread has an additional circumferential groove 40 that now divides the center tread element row 10 into two smaller width rows 102, 104. The presence of the exposed groove 40 after a period of wear increases the wet performance characteristics of the tire.

Figure 3:
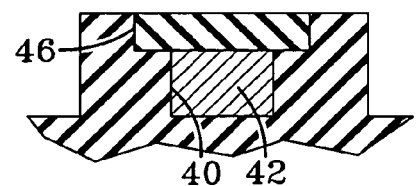
FIG. 3 is a cross-sectional view along lines 3-3 in FIG. 1.

The groove 40 is present in the tread when the tire is cured. FIG. 3 is a cross-sectional view of the center tread element row 10 of the unworn tire tread, along line 3-3 in FIG. 1. Within the groove 40 degradable tread filler 42 is disposed and occupies substantially the entire volume of groove 40. After wear of tread portion 46 to expose groove 40 and degradable tread filler 42, degradable tread filler 42 is dislodged from groove 40 to expose the open volume of the groove.

Tread portion 46 may be a separable tread filler made of a rubber tread compound, for example as disclosed in U.S. application Ser. No. 10/889,492, fully incorporated herein by reference. In another embodiment, tread portion 46 may be made of a rubber tread compound integral with the tread and coextruded therewith.

The degradable tread filler is fabricated from a degradable solid. In one embodiment, the degradable tread filler comprises a hydrolyzable thermoplastic material that is removed from the tire tread by chemical reaction with water or a water-soluble thermoplastic material that is removed from the tire tread by dissolution with water. Examples of hydrolyzable or water-soluble thermoplastics include polyacrylic acids, polyacryl amides, polyvinyl alcohols, polyoxyethylenes, polyesters, or polyamides, or copolymers thereof, or combinations thereof. In one embodiment, the thermoplastic material is a vinyl polymer, such as polyvinyl acetate or polyvinyl alcohol. In another embodiment, the material is a hydrolyzable polyester, such as polyglycolic acid, polylactic acid, polycaprolactone, polyhydroxybutyrate, or polyhydroxyvalerate, or copolymers thereof, or combinations thereof.

In another embodiment, the degradable tread filler comprises a biodegradable material that can passively degrade gradually over time upon exposure to the environment, in particular a wet environment. The biodegradable materials may be hydrolyzable or water-soluble. For example, a biodegradable starch-based material or cellulose-based material could be used that wears away gradually as the tire life progresses. Starch derivatives include, for example, carboxymethyl starch, sulfoethyl starch or hydroxypropyl starch, or a combination thereof. Cellulose derivatives include, for example, carboxymethyl cellulose, hydroxyethyl cellulose, methyl cellulose, methyl hydroxyethyl cellulose, or ethyl hydroxyethyl cellulose, or a combination thereof.

In another embodiment, the degradable tread filler comprises a friable solid. The friable solid may be for example a solid particulate material bound together with a water soluble binder. Solid particulates may include particulate thermoplastic or thermoset polymers, and inorganic particulates such as sand or silica and the like. Suitable binders include but are not limited to any of the water hydrolyzable or water soluble polymers listed previously herein. Upon dissolution of the binder by action of environmental water, the solid particulate material dissipates from the tread groove.

Upon exposure of the degradable tread filler after wear of the covering tread area, the degradable tread filler is gradually removed from the tread groove by the action of environmental water and abrasion.

The degradable tread filler may be produced by any of the various molding methods as are known in the art, including but not limited to extrusion and compression molding and the like. The degradable tread filler may be formed as a continuous profile and subsequently incorporated into a tread during tire build, or may be formed simultaneously as a coextrudate with the tread.

The degradable tread filler may provide support to the wearable tread portion during wear before exposure of the degradable tread filler.

While one specific tread has been illustrated, the concept of using degradable groove filler rings may be applied to almost any conceived tread pattern in order to create a tread configuration that changes significantly upon wear; the change enabling the tread to maintain desired tire characteristics.

What is claimed is:

1. A pneumatic tire comprising a tire tread, the tread comprising a non-skid depth d, the tread comprising tread elements separated by a tread groove and a circumferential or lateral groove in at least one of the tread elements, wherein a separately cured, wearable tread portion is located in the radially outermost portion of the circumferential or lateral groove or a portion of the circumferential or lateral groove, the wearable tread portion being chemically bonded or mechanically secured in the groove or groove portion to the interior surface of the groove or groove portion such that the radially outer surface of the wearable tread portion is substantially flush and continuous with the ground contacting surface of the at least one tread element, the wearable tread portion covering the groove or groove portion with a groove void being created radially inward of the wearable tread portion, the groove void being exposed upon wear of the tread, each of the tread groove and circumferential or lateral groove having the non-skid depth d; and a degradable tread filler disposed in and substantially filling the groove void, the void being exposed upon wear of the wearable tread portion and dislocation of the degradable tread filler; wherein the degradable tread filler comprises a hydrolyzable thermoplastic.

2. The pneumatic tire of claim 1, wherein the degradable tread filler comprises a hydrolyzable thermoplastic selected from the group consisting of polyacrylic acids, polyacryl amides, polyvinyl alcohols, polyoxyethylenes, polyesters, polyamides, polyvinyl acetate, polyvinyl alcohol, polyglycolic acid, polylactic acid, polycaprolactone, polyhydroxybutyrate, polyhydroxyvalerate, copolymers thereof, and mixtures thereof.

3. A pneumatic tire comprising a tire tread, the tread comprising a non-skid depth d, the tread comprising tread elements separated by a tread groove and a circumferential or lateral groove in at least one of the tread elements, wherein a separately cured, wearable tread portion is located in the radially outermost portion of the circumferential or lateral groove or a portion of the circumferential or lateral groove, the wearable tread portion being chemically bonded or mechanically secured in the groove or groove portion to the interior surface of the groove or groove portion such that the radially outer surface of the wearable tread portion is substantially flush and continuous with the ground contacting surface of the at least one tread element, the wearable tread portion covering the groove or groove portion with a groove void being created radially inward of the wearable tread portion, the groove void being exposed upon wear of the tread, each of the tread groove and circumferential or lateral groove having the non-skid depth d; and a degradable tread filler disposed in and substantially filling the groove void, the void being exposed upon wear of the wearable tread portion and dislocation of the degradable tread filler; wherein the degradable tread filler comprises a biodegradable starch-based material or cellulose-based material.

4. The pneumatic tire of claim 3, wherein the degradable tread filler comprises a biodegradable material selected from the group consisting of carboxymethyl starch, sulfoethyl starch, hydroxypropyl starch, carboxymethyl cellulose, hydroxyethyl cellulose, methyl cellulose, methyl hydroxyethyl cellulose, ethyl hydroxyethyl cellulose, and combinations thereof.

5. A pneumatic tire comprising a tire tread, the tread comprising a non-skid depth d, the tread comprising tread elements separated by a tread groove and a circumferential or lateral groove in at least one of the tread elements, wherein a separately cured, wearable tread portion is located in the radially outermost portion of the circumferential or lateral groove or a portion of the circumferential or lateral groove, the wearable tread portion being chemically bonded or mechanically secured in the groove or groove portion to the interior surface of the groove or groove portion such that the radially outer surface of the wearable tread portion is substantially flush and continuous with the ground contacting surface of the at least one tread element, the wearable tread portion covering the groove or groove portion with a groove void being created radially inward of the wearable tread portion, the groove void being exposed upon wear of the tread, each of the tread groove and circumferential or lateral groove having the non-skid depth d; and a degradable tread filler disposed in and substantially filling the groove void, the void being exposed upon wear of the wearable tread portion and dislocation of the degradable tread filler; wherein the degradable tread filler comprises a friable solid comprising a solid particulate material bound together with a water soluble binder.

* * * * *